United States Patent [19]

Parsons

[11] E Re. 30,469

[45] Reissued Jan. 6, 1981

[54] PREHEATER FOR LIME KILN

[75] Inventor: Marshall F. Parsons, Washington, D.C.

[73] Assignee: Detroit Lime Company, Detroit, Mich.

[21] Appl. No.: 901,019

[22] Filed: Apr. 27, 1978

Related U.S. Patent Documents

Reissue of:

[64] Patent No.: 3,766,663
Issued: Oct. 23, 1973
Appl. No.: 232,579
Filed: Mar. 7, 1972

[51] Int. Cl.[2] ..... F26B 17/12

[52] U.S. Cl. ..... 34/168; 432/95; 432/106

[58] Field of Search ..... 34/168; 432/106, 95

[56] References Cited

U.S. PATENT DOCUMENTS

| | | | |
|---|---|---|---|
| 1,778,281 | 10/1930 | Sobek | 432/99 |
| 2,590,090 | 3/1952 | De Vaney | 432/5 |
| 2,653,809 | 9/1953 | Azbe | 432/80 |
| 2,739,800 | 3/1956 | Sisco | 432/45 |
| 3,413,733 | 12/1968 | Pospisil | 34/171 |

FOREIGN PATENT DOCUMENTS

| | | | |
|---|---|---|---|
| 153096 | 9/1953 | Australia | 432/266 |
| 153562 | 10/1953 | Australia | 432/266 |
| 202281 | 6/1956 | Australia | 432/266 |
| 228915 | 6/1960 | Australia | 432/266 |
| 246114 | 9/1960 | Australia | 432/266 |
| 271556 | 9/1964 | Australia | 432/266 |
| 292182 | 7/1969 | Australia | 432/266 |
| 137355 | 10/1965 | Czechoslovakia | 432/266 |
| 125989 | 7/1967 | Czechoslovakia | 432/266 |
| 150879 | 1/1973 | Czechoslovakia | 432/266 |
| 83593 | 1/1955 | France | 432/266 |
| 1502170 | 10/1967 | France | 432/266 |
| 927648 | 12/1960 | United Kingdom | 432/266 |

OTHER PUBLICATIONS

Pages 70, 72, 156, and 157 of the Article, "Calcination Control for High Calcium and Magnesium Limes in Rock Products, " Aug. 1944 Issue.

Pages 118, 120, 122, 124, 138 and 140 of the Article, "Rotary Kiln, Its Performance and Development in Rock Products," Oct. 1955 Issue.

*Primary Examiner*—John J. Camby
*Attorney, Agent, or Firm*—Harness, Dickey & Pierce

[57] ABSTRACT

A preheater for particulate material comprising a cylindrical refractory lined vessel with top feed and exhaust offtake. The preheater diameter is enlarged below the offtake so that the sloping material forms an area surrounded by ports which receive hot gases from the kiln. The lower portion of the preheater is conical, leading toward a small central discharge point. This portion constitutes a soaking zone in which heat is allowed to penetrate the material.

13 Claims, 3 Drawing Figures

11
12
13
14
15
16
17
18
19
20
21
22
23
24
25
26
27
28
29
30
31
32
33
35
36
37
2
2

PREHEATER FOR LIME KILN

Matter enclosed in heavy brackets [ ] appears in the original patent but forms no part of this reissue specification; matter printed in italics indicates the additions made by reissue.

BACKGROUND AND BRIEF SUMMARY OF THE INVENTION

The invention relates to the preheating of stone or sized particulate material such as limestone which is being fed to a rotary kiln calcining system. The invention is also applicable to similar calcining or gas/solid heat transfer processes.

A rotary kiln calcining device has relatively low thermal efficiency, particularly with highly endothermic processes such as the burning of lime. Rising fuel costs have increased the economic feasibility of preheating devices for commercial rotary kilns.

These preheating devices are based on convection heat transfer with the hot gases exhausting from the kiln being passed through voids in the feed material as in a vertical shaft kiln. Because of the relatively small size of rotary kiln feeds and the large volume of combustion gases, impractically high pressure drops will be developed in the system unless the beds are relatively wide and shallow. The gases should have uniform motion across the entire bed to avoid overheating or fusing.

Because of the relatively higher heat transfer efficiency of preheaters, the calcining reaction tends to move from the rotary kiln into the preheater resulting in higher kiln exhaust gas temperatures. These high temperature gases result in high surface temperatures on the stone feed fed to the kiln, with the result that the preheater has little cooling effect on the gases. The cumulative effect is that a circulating heat stream is set up at the juncture of the preheater and kiln outlet, the high temperatures increasing heat losses and mechanical difficulties.

In the conventional preheater the kiln exhaust gases are introduced directly to the preheater discharge area. The resulting high temperatures create great radiation and efficiency losses. A cumbersome feeding mechanism is required to be effective over the major portion of the bed area, this mechanism operating at unusually high temperatures. Furthermore, the short time interval during which the feed material is subjected to high temperatures results in only the outer surface portions of the stone being heated, the centers remaining at comparatively low temperatures.

It is a general object of the present invention to overcome the above difficulties of conventional preheating devices. Briefly, the invention comprises a moving bed of material so arranged that the kiln exhaust gases are introduced at a level in the preheater considerably above the feeder which discharges the stone to the rotary kiln. This creates a "soaking" or holding zone between the gas entry and discharge levels which may have a sufficient retention time to allow the high surface temperatures developed on each particle to be diffused substantially into its entire volume. The result is a preheated material of more uniform temperature with a lower surface temperature but a greater stored heat content. When this material is fed to the rotary kiln it will not have the tendency to return heat to the gas stream but will absorb some heat, maintaining gas temperatures at a lower level.

It is a further object of the invention to provide a novel and improved preheater in which the soaking zone portion couples the entire cross-sectional area of the preheater stone beds to a relatively small and simple feeding device working at moderate temperatures, thus reducing maintenance problems. The conically formed holding zone contributes to the uniform motion of the material and facilitates coupling the large preheater area to the single feeder.

It is a further object to provide an improved preheater of this nature which develops sufficient stone bed surface to allow admission of the gases into the relatively small void areas of the material. The hot gases are introduced around the outer periphery of a circular cross-section and are removed from the center. Since flow resistance is higher for hot than for cooler gases, this arrangement allows the development of stone bed void areas roughly proportional to the gas temperatures to give efficient use of the bed area.

DESCRIPTION OF THE PREFERRED EMBODIMENT

Figure 1:
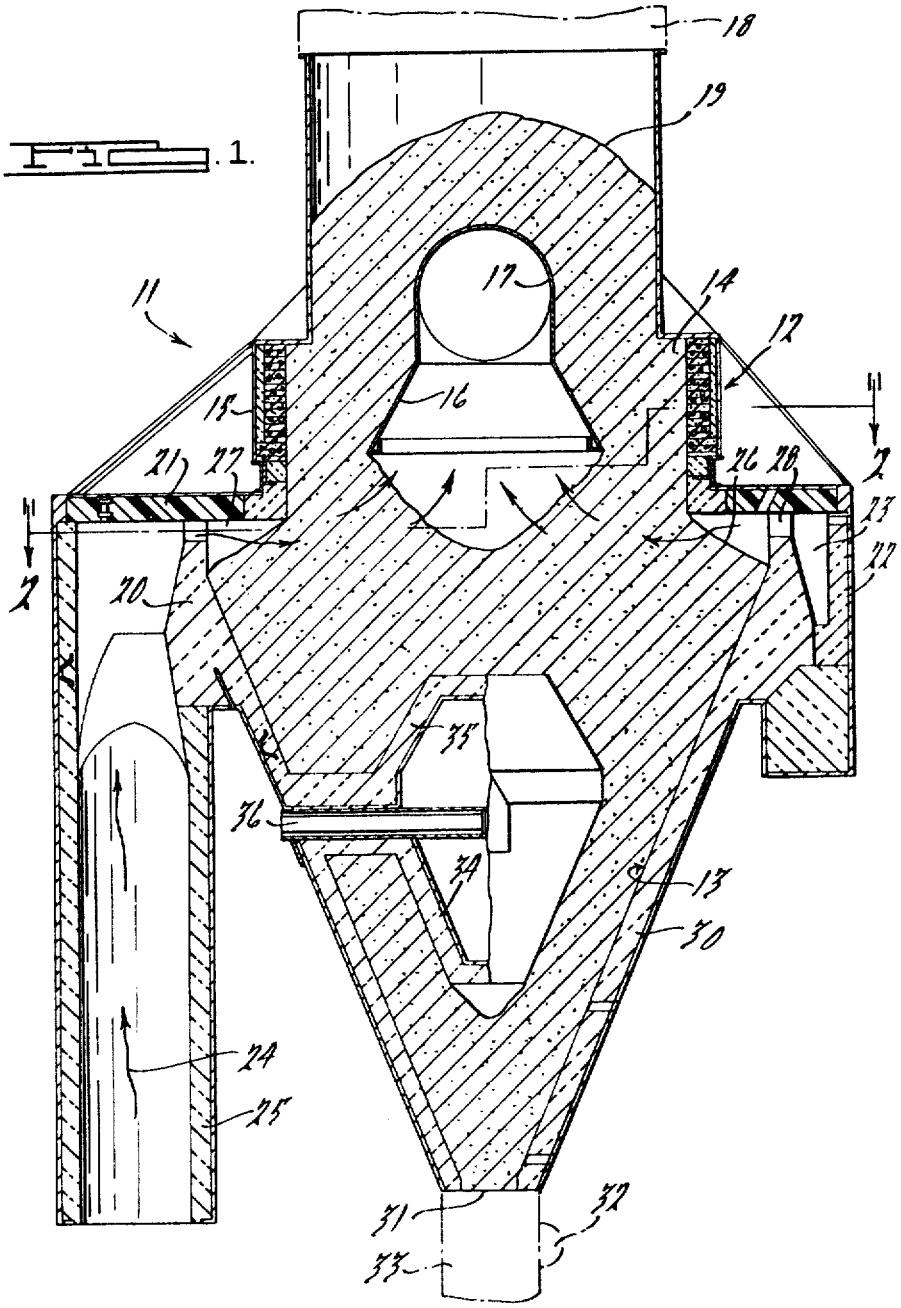
FIG. 1 is a cross-sectional view in elevation of the novel preheater taken along the line 1—1 of FIG. 2.
Figure 2:
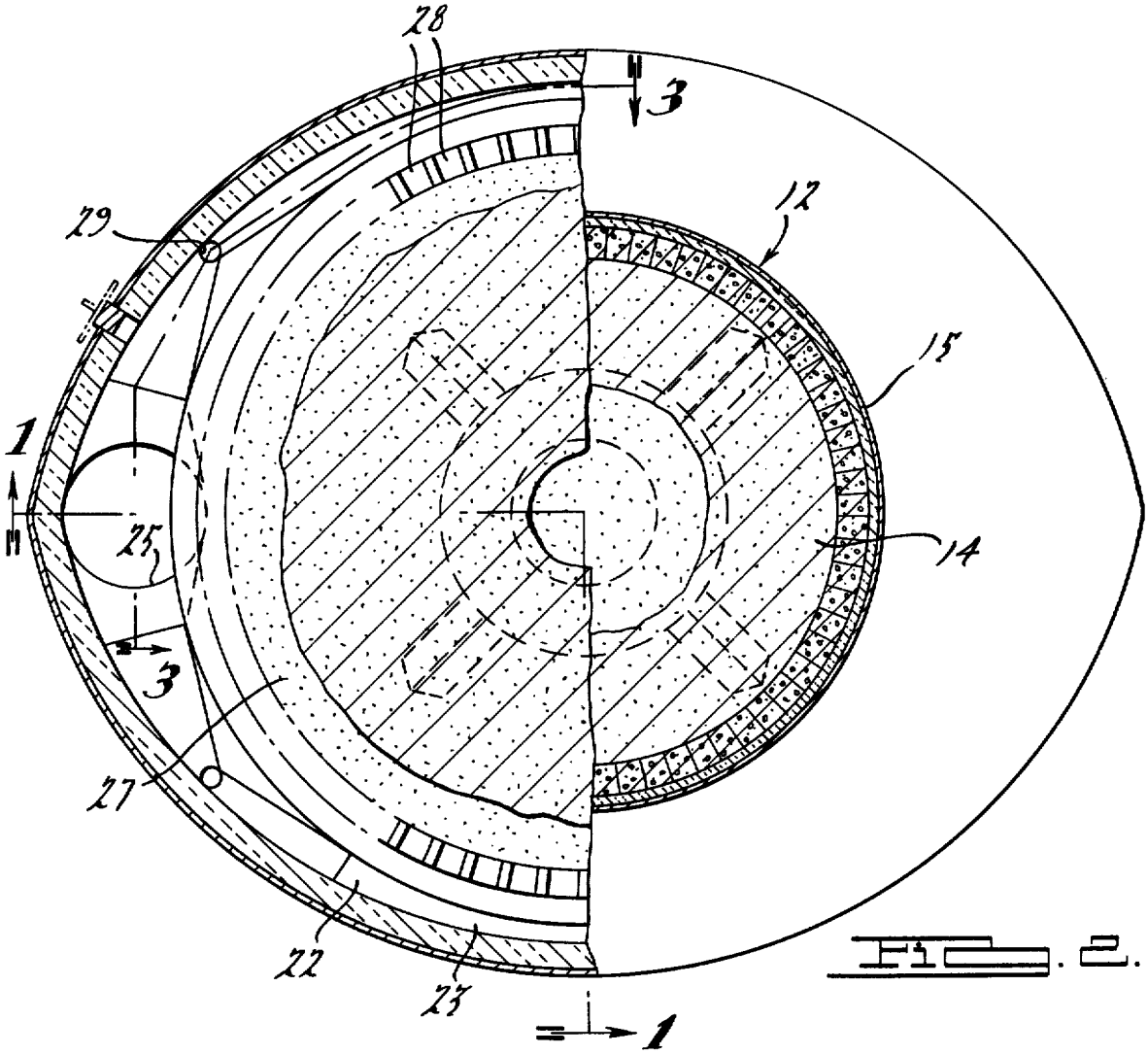
FIG. 2 is a plan cross-sectional view taken along the line 2—2 of FIG. 1.
Figure 3:
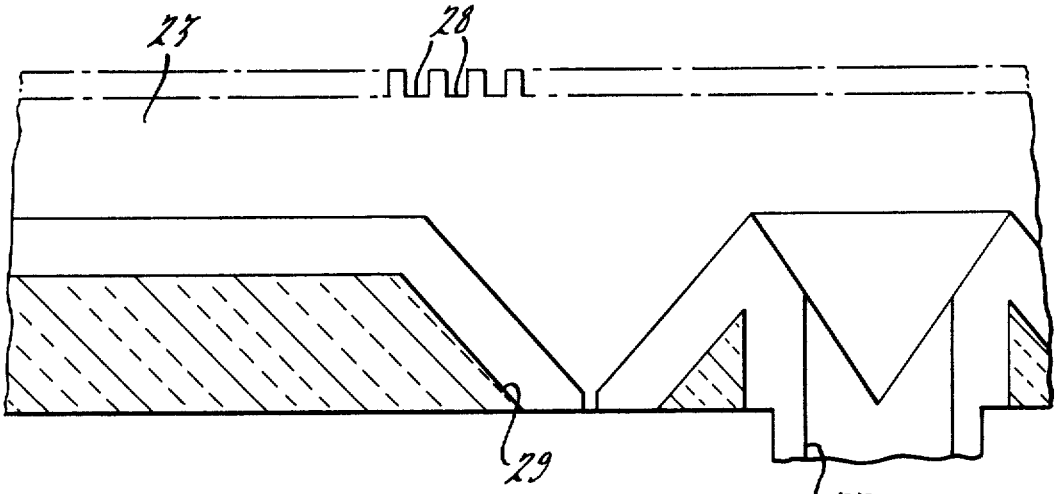
FIG. 3 is a fragmentary cross-sectional view taken along the line 3—3 of FIG. 2 and showing louver construction.

The preheater is generally indicated at 11 and in general comprises a vessel having an outer steel shell or framework generally indicated at 12 and an inner lining generally indicated at 13 of refractory material. Since the invention pertains to the configuration rather than the specific structural details of the preheater, the individual portions of the shell, framework and lining are not described in full detail. It will be understood however that appropriate supports, braces, refractory linings, poke and blow holes and other structural elements may be varied to suit requirements.

The stone beds 14 are formed in a cylindrically shaped section 15 of this vessel. An exhaust offtake 16 is concentrically mounted in section 15 and is of downwardly open, flared shape having an outer diameter of perhaps 60 to 75 percent of the vessel diameter. The offtake is shown as supported by a horizontal duct 17 extending through section 15 and leading to a blower intake (not shown). The top of vessel section 15 is enclosed by an air lock feed device indicated schematically in dot-dash lines at 18 through which the stone is introduced, so that the kiln exhaust gases may be drawn by induced draft through the stone beds without drawing in cool ambient air. The air lock feed device may take any of various conventional forms, such as a rotating gate having a plurality of pockets formed by radial vanes. The upper level 19 of material is maintained at a point above exhaust offtake 16 so that the material forms a symmetrical stone volume for exhaust of the gases.

At a suitable depth below the level of offtake 16 the cylindrical preheater walls are increased to a larger diameter as indicated by the reference numeral 20. The preheater has a horizontal ledge 21 which interconnects wall sections 15 and 20 and extends outwardly beyond section 20. A wall 22 extends downwardly from the outer edge of ledge 21, thus creating an annular distribution duct 23 between vessel section 20 and wall 22. Exhaust gases 24 from the rotary kiln (not shown) are fed upwardly through a conduit 25 to this duct. Because of the angle of repose of frustoconical surface 26 of stone bed 14 as it leaves section 15 and spreads out to section 20, an annular space 27 will be created below ledge 21. A plurality of ports 28 are provided in the upper edge of section 20 immediately below ledge 21, and hot gases will be drawn inwardly from duct 23 through these ports to the stone bed. The flow of hot gases as they pass through the ports will be generally in an inward radial direction, and transverse to the downward movement of material. The hot gases will thus be evenly distributed over the relatively large frustoconical area of the material which is symmetrical with respect to the offtake area. The gases will flow upwardly through the voids in the material as they pass through section 15 to the offtake. Duct 23 will allow dust entrained in the gases to settle, the dust being removable through drains 29.

A soaking or holding chamber 30 is formed on the preheater extending below section 20. This portion of the preheater is formed conically at a relatively steep angle, leading downwardly to a single centrally located discharge port 31 of relatively small area. A feeding device indicated schematically in dot-dash lines at 32 is attached to outlet 31 and dispatches the material through a conventional feed pipe or chute indicated in dot-dash lines at 33 to the rotary kiln (not shown). To assure movement of the material over the entire cross-section of the preheater, a baffle 34 is mounted inwardly of conical section 30, this baffle having a conical shape along the major portion of its length which is complementary to section 30 and a reverse conical shape 35 in its upper portion. The baffle, which is supported by a plurality of radially extending beams 36, will thus insure movement of the material over the entire cross-section of preheater section 30 to outlet 31. Little gas flow will take place in this zone because of the high resistance of the deep beds and the relatively small cross-sectional area, and the section will thus constitute a holding zone in which heat will be absorbed by the interiors of the particles.

The dimensions of holding section 30 and particularly the retention time of stone therein, will vary to suit requirements. These will be governed by three main factors:

a. Temperature of the gases entering section 20.

b. Average size of the stone particles.

c. Thermal conductivity of the stone.

Basically, the stone which has just exited gas-stone section 20 has a surface temperature equal to the gas temperature. Let us assume for example that it is 2,000° F. on the surface of a 1½ inch spherical lump, but only 1,200° F. at the center. At a thermal conductivity in the expected range of slate or shale (for lightweight aggregate kilns) the thermal diffusion might almost equalize the temperature over the outer three-eighths inch (or seven-eighths of the total lump volume) in 7 to 11 minutes.

In limestone there is some difference in that there is heat used in the contact zone to make a thin film of lime on the stone surface, so that the inside of the stone will not have absorbed as much heat. As this passes through holding section 30, the surface may recarbonate making limestone and giving off heat. This will delay the achievement of relative equilibrium and require a longer time in the holding section.

In operation, hot gases 24 will flow upwardly through conduit 25 and around duct 23, entering chamber 27 through ports 28 and passing through the voids in material 14. These gases will flow upwardly through cylindrical section 15 of the preheater to exhaust offtake 16. As the material moves downwardly through this zone, it will spread out against vessel section 20, this section, like section 15, being an active heating area in which the hot gases flow through the material voids. Because the heating area is relatively close to feed device 18 through which the particles enter at ambient temperatures, there will be large temperature differentials between the hot gases and the surfaces of the particles. This will result in immediately high rates of heat absorption, contributing to higher production for a given amount of fuel, or less fuel per unit of productivity.

As the heated material continues to descend, it will enter holding section 30 where it will gradually be narrowed down to a relatively small cross-sectional area so as to be discharged at central opening 31. During the time the material is in the holding zone, the heat absorbed by the outer portions of the particles will soak into their interiors to create a more uniform temperature throughout.

I claim:

1. In a preheater for particulate materials such as limestone, a refractory lined vessel having an upper material intake section, an exhaust offtake concentrically mounted in said section, means for feeding material into said section, a gas intake section below said material intake section, a plurality of circumferentially arranged ports around said gas intake section, means feeding hot gases to said ports, whereby the gases will flow radially inwardly through said material, a material holding section extending downwardly from said gas intake section, said material holding section being entirely below said ports and being sufficiently deep to permit heat to be absorbed by the interiors of the particles of material, [, and a material discharge port at the bottom of said material holding section] *the depth of said material holding section relative to the height of said gas intake section being so great that substantially the entire material holding section is remote from the path of gases flowing into said gas intake section, said material holding section being so constructed that little gas flow will take place in said holding section, a material discharge port at the bottom of said material holding section, and feeding means connected to said material discharge port and controlling the retention time of material in said holding section so as to cause the high surface temperatures developed on each particle to be diffused substantially into its entire volume.*

2. The combination according to claim 1, said material intake section being cylindrical, said exhaust offtake being circular, said material feeding means being so arranged that the level of material is maintained above said offtake.

3. The combination according to claim 1, said gas intake section being of larger diameter than said material intake section and so shaped that the angle of repose of descending material will form an inclined frustoconical surface around its periphery.

4. The combination according to claim 3, said gas feeding means comprising an annular distribution duct around said ports, the ports being located adjacent the top of said enlarged section.

5. The combination according to claim 1, said material holding section being conical, said material discharge port being centrally located and of relatively small area.

6. [The combination according to claim 5, further provided with] *In a preheater for particulate materials such as limestone, a refractory lined vessel having an upper material intake section, an exhaust offtake concentrically mounted in said section, means for feeding material into said section, a gas intake section below said material intake section, a plurality of circumferentially arranged ports around said gas intake section, means feeding hot gases to said ports, whereby the gases will flow radially inwardly through said material, a conical material holding section extending downwardly from said gas intake section, said material holding section being entirely below said ports and being sufficiently deep to permit heat to be absorbed by the interiors of the particles of material, a material discharge port of relatively small area centrally located at the bottom of said material holding section, and* a conical lower baffle concentric with and spaced inwardly from said conical holding member, whereby the entire cross-sectional area of said holding zone will be coupled to said discharge port.

7. In a preheater for particulate materials such as limestone, a refractory lined vessel having a cylindrical section, a circular exhaust offtake concentrically mounted in said section, means for feeding material into the top of said vessel so that the level of material is maintained above said offtake, a section of larger diameter than said cylindrical vessel section below the offtake and so shaped that the angle of repose of descending material will form an outwardly and downwardly inclined frustoconical surface around its periphery, a plurality of circumferentially arranged ports adjacent the top of said enlarged section, means feeding hot gases to an annular distribution duct around said ports, a conical material holding section extending downwardly from said enlarged section, said material holding section being entirely below said ports and being sufficiently deep to permit heat to be absorbed by the interiors of the particles of material, [, and a single centrally located material discharge port of relatively small area at the bottom of said holding section] *the depth of said material holding section being so great relative to the height of said enlarged section that substantially the entire material holding section is remote from the path of gases flowing onto said frustoconical material surface, said material holding section being so constructed that little gas flow will take place in said holding section, a single centrally located material discharge port of relatively small area at the bottom of said holding section, and feeding means connected to said material discharge port and controlling the retention time of material in said holding section so as to cause the high surface temperatures developed on each particle to be diffused substantially into its entire volume.*

8. [The combination according to claim 7, further provided with] *In a preheater for particulate materials such as limestone, a refractory lined vessel having a cylindrical section, a circular exhaust offtake concentrically mounted in said section, means for feeding material into the top of said vessel so that the level of material is maintained above said offtake, a section of larger diameter than said cylindrical vessel section below the offtake and so shaped that the angle of repose of descending material will form an outwardly and downwardly inclined frustoconical surface around its periphery, a plurality of circumferentially arranged ports adjacent the top of said enlarged section, means feeding hot gases to an annular distribution duct around said ports, a conical material holding section extending downwardly from said enlarged section, said material holding section being entirely below said ports and being sufficiently deep to permit heat to be absorbed by the interiors of the particles of material, a single centrally located material discharge port of relatively small area at the bottom of said holding section, and* a conical lower baffle concentric with and spaced inwardly from said conical holding chamber, whereby the entire cross-sectional area of said holding zone will be coupled to said discharge port.

9. The combination according to claim 8, said offtake comprising a downwardly open frustoconical member connected to a horizontal duct passing through said cylindrical vessel section.

10. In a preheater for particulate materials such as limestone, a refractory lined vessel having a cylindrical section, a circular exhaust offtake concentrically mounted in said section, means for feeding material into the top of said vessel so that the level of material is maintained above said offtake, a section of larger diameter than said cylindrical vessel section below the offtake and so shaped that the angle of repose of descending material will form an inclined frustoconical surface around its periphery, a plurality of circumferentially arranged ports adjacent the top of said enlarged section, means feeding hot gases to an annular distribution duct around said ports, said annular distribution duct being so formed as to allow settling of dust entrained in said gases, drains for said dust in the bottom of said duct, a conical material holding section extending downwardly from said enlarged section, and a single centrally located material discharge port of relatively small area at the bottom of said holding section.

11. In a preheater for particulate materials such as limestone, a refractory lined vessel having an upper material intake section, an exhaust offtake in said section, means for feeding material into said section, a gas intake section, means feeding hot gases to said gas intake section, a material holding section extending downwardly from said gas intake section, [and] a material discharge port at the bottom of said material holding section, said gas intake section being located a substantial distance above said discharge port whereby the hot gases will flow across stone having a relatively low surface temperature, said material holding section being entirely below said gas intake section and of sufficient dimensions to allow time for substantial inward diffusion of the surface heat on particles descending therethrough, *the depth of said material holding section being so great relative to the height of said gas intake section that substantially the entire material holding section is remote from the path of gases flowing into said gas intake section, said material holding section being so constructed that little gas flow will take place in said holding section, and feeding means connected to said material discharge port and controlling the retention time of material in said holding section so as to cause the high surface temperatures developed on each particle to be diffused substantially into its entire volume.*

12. The combination according to claim 11, said material intake section being cylindrical, said material holding section being conical.

13. The combination according to claim 12, said gas intake section being disposed between said material intake and holding sections and having an annular gas distribution duct.

* * * * *